United States Patent
Wright et al.

(10) Patent No.: US 7,779,162 B2
(45) Date of Patent: *Aug. 17, 2010

(54) METHODS AND SYSTEMS FOR PROVIDING AN ASYMMETRIC ETHERNET SERVICE

(75) Inventors: Steven A. Wright, Roswell, GA (US); Thomas Anschutz, Conyers, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1006 days.

This patent is subject to a terminal disclaimer.

(21) Appl. No.: 10/636,005

(22) Filed: Aug. 7, 2003

(65) Prior Publication Data

US 2005/0033797 A1    Feb. 10, 2005

(51) Int. Cl.
  *G06F 15/16* (2006.01)
  *H04L 12/413* (2006.01)
  *H04L 12/28* (2006.01)
  *H04L 12/56* (2006.01)
(52) U.S. Cl. ............... 709/250; 709/229; 709/249; 370/447; 370/393; 370/402
(58) Field of Classification Search ............ 709/250, 709/229, 249; 370/393, 402, 447
See application file for complete search history.

(56) References Cited

U.S. PATENT DOCUMENTS

| H1175 H | 4/1993 | Giorgio |
| 5,390,239 A | 2/1995 | Morris et al. |
| 5,617,417 A | 4/1997 | Sathe et al. |
| 5,936,963 A * | 8/1999 | Saussy ............ 370/447 |
| 6,002,670 A | 12/1999 | Rahman et al. |
| 6,061,357 A * | 5/2000 | Olshansky et al. ...... 370/401 |
| 6,198,749 B1 | 3/2001 | Hui et al. |
| 6,243,394 B1 * | 6/2001 | Deng ............ 370/466 |
| 6,577,653 B1 | 6/2003 | Rochberger et al. |
| 6,785,265 B2 * | 8/2004 | White et al. ............ 370/352 |
| 6,798,769 B1 | 9/2004 | Farmwald |

(Continued)

OTHER PUBLICATIONS

Office communication issued by the United States Patent and Trademark Office in connection with U.S. Appl. No. 10/636,366, mailed May 4, 2007, 9 pages.

(Continued)

*Primary Examiner*—George C Neurauter, Jr.
*Assistant Examiner*—Kishin G Belani
(74) *Attorney, Agent, or Firm*—Hanley, Flight & Zimmerman, LLC

(57) ABSTRACT

Methods and systems provide an asymmetric Ethernet service. An Ethernet network transports Ethernet frames over an asymmetric connection to a point of service for a subscriber located remotely from the Ethernet network, and the Ethernet connection is asymmetric in that the effective data transfer rates for uploading and downloading of data over the Ethernet connection are different. The subscriber may then have Ethernet capable network devices such as routers and computers linked to the point of service so that data transfer between the network devices of the subscriber and the Ethernet network occurs over the asymmetric Ethernet connection. The Ethernet network allows for communication between the network devices of the subscriber and any desired Ethernet network resources, such as network resources located on the Ethernet network or resources of downstream networks such as the global Internet that are available through the Ethernet network.

22 Claims, 2 Drawing Sheets

U.S. PATENT DOCUMENTS

| | | |
|---|---|---|
| 6,834,058 B1 | 12/2004 | Moyal et al. |
| 6,904,054 B1 * | 6/2005 | Baum et al. ................. 370/467 |
| 7,054,376 B1 | 5/2006 | Rubinstain et al. |
| 7,154,911 B2 | 12/2006 | Counterman |
| 7,177,284 B2 | 2/2007 | Peleg et al. |
| 7,315,538 B2 | 1/2008 | Wright et al. |
| 2003/0036352 A1 | 2/2003 | Deguchi |
| 2003/0103559 A1 | 6/2003 | Palm |
| 2003/0154313 A1 * | 8/2003 | Banerjee et al. ............. 709/250 |
| 2003/0198217 A1 * | 10/2003 | Redfern ....................... 370/352 |
| 2004/0213252 A1 * | 10/2004 | Lee et al. ................. 370/395.1 |
| 2005/0025175 A1 * | 2/2005 | White et al. ................. 370/445 |
| 2005/0030974 A1 | 2/2005 | Wright et al. |
| 2006/0098573 A1 | 5/2006 | Beer et al. |
| 2007/0110041 A1 * | 5/2007 | White et al. ................. 370/352 |
| 2008/0310436 A1 * | 12/2008 | Bareis ........................ 370/402 |

OTHER PUBLICATIONS

Office communication issued by the United States Patent and Trademark Office in connection with U.S. Appl. No. 10/636,366, mailed Sep. 26, 2007, 12 pages.

Notice of Allowance and Fees Due issued by the United States Patent and Trademark Office in connection with U.S. Appl. No. 10/636,432, mailed Nov. 2, 2007, 9 pages.

Office communication issued by the United States Patent and Trademark Office in connection with U.S. Appl. No. 10/636,432, mailed Apr. 23, 2007, 12 pages.

* cited by examiner

METHODS AND SYSTEMS FOR PROVIDING AN ASYMMETRIC ETHERNET SERVICE

This patent relates to U.S. patent application Ser. No. 10/636,432, now U.S. Pat. No. 7,315,538, filed on Aug. 7, 2003 and issued on Jan. 1, 2008.

TECHNICAL FIELD

The present invention is related to Ethernet communications. More particularly, the present invention is related to providing an asymmetric Ethernet service from a service provider network to a subscriber point of service.

BACKGROUND

Ethernet communications are a popular data network protocol used to carry frames of data. Ethernet communications are often used within local area networks to carry data between nearby computers as well as within wide area networks where the Ethernet may be carried through lower layer connections such as an asynchronous transfer mode ("ATM") link. Ethernet communications allow for the transfer between end points of higher layer data packets such as Internet Protocol packets that are destined for a remote location such as a domain of the global Internet. The original Ethernet standards related to a protocol for accessing a shared communication medium. Over time this has evolved to a suite of protocols that are commonly used on symmetric point-to-point links between Ethernet switching devices. Ethernet protocols can also be encapsulated and transported over other protocols, e.g., Ethernet over ATM per RFC 1483.

Typically, an Ethernet network includes many closely located devices interconnected via the Ethernet protocol to form a local area network. Because the devices are located closely, there is a direct Ethernet connection between the devices since the distances are not greater than that possible over a direct Ethernet connection. However, some situations call for a node of an Ethernet network to be located remotely from the Ethernet network itself such that the distance is too great for a direct Ethernet connection to be utilized.

Ethernet service has been provided to certain customers having a point of service that is remote from the Ethernet network such that a direct Ethernet connection cannot be utilized. This Ethernet service is symmetrical and provides a relatively high bandwidth to subscribers in both the upload and download directions, but because this data transfer is symmetrical it requires a relatively high amount of bandwidth of a service provider network interconnecting the point of service to the Ethernet network. Thus, this symmetrical Ethernet service is not an economical option for many subscribers.

SUMMARY

Embodiments of the present invention address these issues and others by providing an asymmetrical Ethernet service to a point of service for subscribers. Thus, the subscribers may connect their Ethernet devices such as routers and/or computers to the asymmetric Ethernet service which provides a difference in the upload and download data transfer speeds when communicating with the remote Ethernet network.

One embodiment is a method of providing asymmetric Ethernet service. The method involves providing an Ethernet network remote from a point of service and in communication with the point of service. The method further involves establishing an asymmetric Ethernet communication between the remote Ethernet network and the point of service to allow access to the asymmetric Ethernet service by a subscriber.

Another embodiment is a system for providing asymmetric Ethernet service. The system includes an Ethernet network including an Ethernet port and includes a point of service located remotely from the Ethernet port of the Ethernet network. An Ethernet communications connection exists between the subscriber point of service and the Ethernet port of the Ethernet network. The Ethernet communications connection provides for an upload speed from the subscriber point of service to the Ethernet port of the Ethernet network that is a different speed than a download speed from the Ethernet port of the Ethernet network to the point of service.

Another embodiment is a system for providing asymmetric Ethernet service to a network device of a subscriber. The system includes an Ethernet network including an Ethernet port and includes a point of service located remotely from the Ethernet network. An Ethernet connection exists between the point of service and the Ethernet port of the Ethernet network. The Ethernet connection provides for an upload speed from the point of service to the Ethernet port of the Ethernet network that is a different speed than a download speed from the Ethernet port of the Ethernet network to the point of service. An Ethernet connection also exists between the point of service and a network device of the subscriber.

DETAILED DESCRIPTION

Embodiments of the present invention provide for an asymmetric Ethernet service to be provided between an Ethernet network and a point of service for a subscriber. The asymmetric Ethernet service provides for effective data transfer rates that are greater in one direction of transfer than the other, thereby freeing the data network between the point of service and the Ethernet network from providing a full speed data transfer rate in both directions. The asymmetric Ethernet service may be provided by including the point of service at the network interface device outside the premises of the subscriber where the endpoint communications device is maintained as part of a service provider network to eliminate the requirement of additional communications devices such as DSL or cable data modems within the premises of the subscriber. Alternatively, the asymmetric Ethernet service may be provided through communications devices such as DSL or cable modems of the subscriber rather than including them as endpoint devices of the service provider network.

Figure 1:
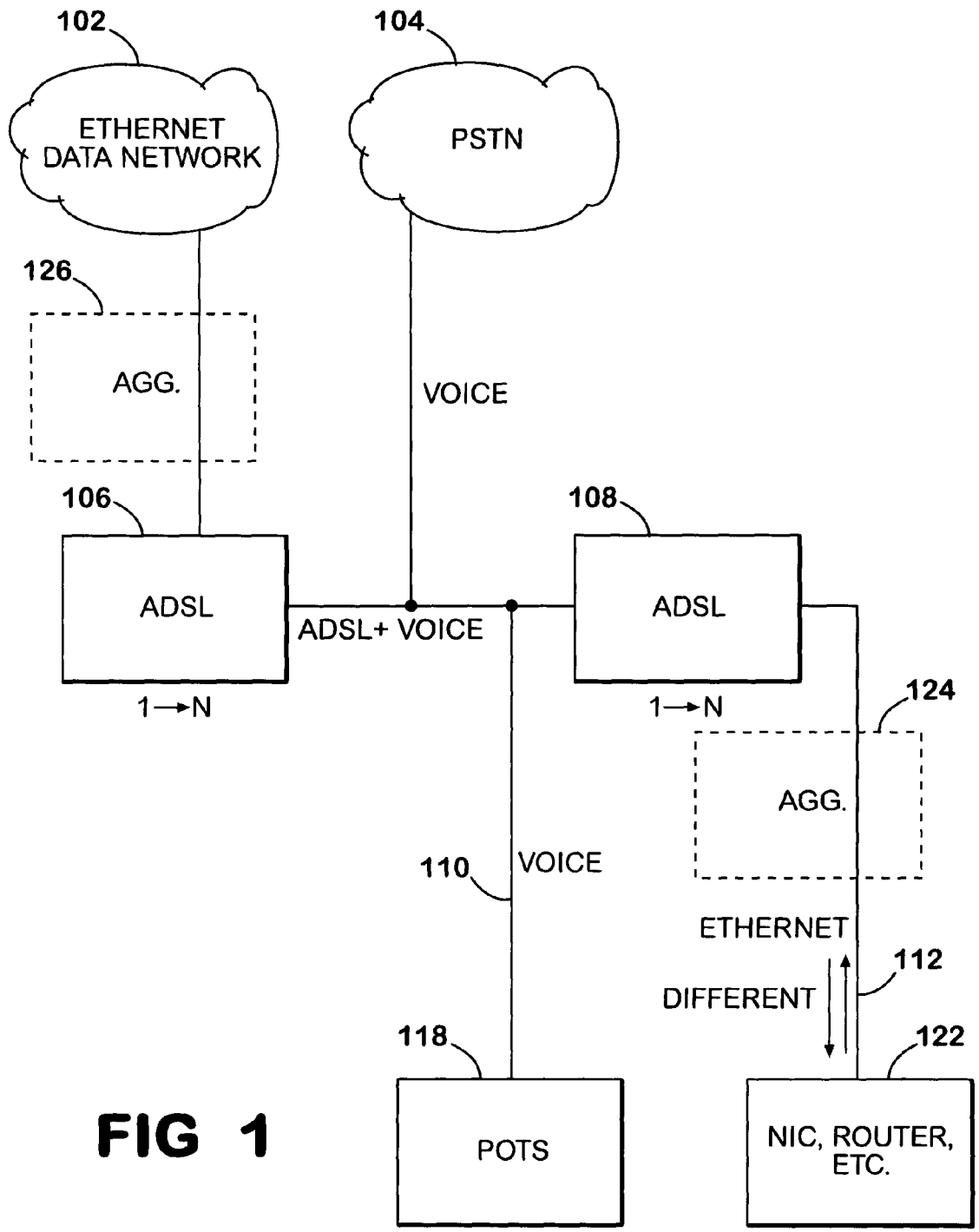
FIG. 1 is a high level view of an asymmetric Ethernet service from an Ethernet network to a point of service of a subscriber according to an embodiment of the present invention.

FIG. 1 shows a high level view of an asymmetric Ethernet service. An Ethernet network 102 provides Ethernet data services for subscribers, such as providing access to LAN resources such as email and file servers and/or access to a downstream Internet Service Provider ("ISP"). A service provider may provide the connectivity between the Ethernet network 102 and the point of service where the subscriber gains access to the Ethernet network at a device 122 of the subscriber such as a network interface card ("NIC") equipped computer, router, or other Ethernet capable device. The service provider, or another service provider, may also provide access to the public switched telephone network ("PSTN") 104 for subscribers. As shown in FIG. 1, the Ethernet network access may be distributed to the subscriber from the Ethernet network 102 in various ways. For example, ADSL modem 106 or set of modems contained within a DSL access multiplexer ("DSLAM") of a service provider may be used to transport the Ethernet data communications between a central office ("CO") of the service provider and out to the location of the subscriber. The ADSL communications carrying the Ethernet data are received at a service point by another ADSL modem 108 or set of modems where the ADSL data communications are then converted back to Ethernet layer communications for access by the subscriber at the point of service.

The Ethernet communications extend over communication lines 112 to the point of service, such as the NIC 122. These Ethernet communications are made asymmetric by the ADSL modems 106 and 108 providing the asymmetry between the upload and download data transfer rates while carrying the Ethernet data frames. The upload speed may be faster than the download speed or the download speed may be faster than the upload speed. For example, ADSL modems 106 may be type ATU-C and ADSL modems 108 may be ATU-R so that the download for the subscriber is faster than the upload. Alternatively, the ADSL modems 106 may be type ATU-R while ADSL modems 108 may be ATU-C so that the upload for the subscriber is faster than the download.

Providing an upload speed faster than a download speed between the ADSL modems 106 and 108 may not be permitted under a regulatory scheme where copper communications extend from the ADSL modem 106 back to the network 102 and where the upload speed refers to an upload from the subscriber to the service provider network. However, the ADSL modem 106 may be positioned away from a CO to a point that is closer to the point of service where the ADSL modem 108 is positioned. The ADSL modem 108 may be positioned at the point of service where located within the subscriber's premises, or alternatively very closely to the point of service, such as at a street corner out from the location of the subscriber. Thus, the distance the Ethernet link must travel from the ADSL modem 108 to the point of service for access by the subscriber may be minimized. Communications between the location of the ADSL modem 106 and the network 102 may then occur over fiber to avoid the faster upload speeds from creating copper networking issues.

The asymmetric Ethernet service extends from an Ethernet port of the ADSL modem 108 over communications line 112 into the device 122. Thus, the subscriber can access the Ethernet network over the asymmetric Ethernet connection at the device 122. The device 122 appears as a node on the Ethernet network 102 even though the device 122 is located remotely from the Ethernet network 102 because the Ethernet frames that are exchanged between the Ethernet network 102 and the device 122 are being carried by the ADSL connectivity.

The asymmetric Ethernet service may also utilize aggregated Ethernet connections so as to increase the bandwidths of the data transfer directions while maintaining the asymmetry. For example, an aggregator device 126 such as an Ethernet switch may be positioned between the DSLAM containing modems 106 and the downstream link to the Ethernet network 102. The aggregator device 126 aggregates the communications of multiple (1-N) ADSL modems 106 that are in communication with multiple (1-N) ADSL modems 108. The multiple ADSL modems 108 are then aggregated by an aggregator device 124 located between the modems 108 and the point of service. Thus, the single Ethernet link 112 may benefit from the bandwidth of multiple ADSL modem connections to increase the effective bandwidth of the asymmetric Ethernet service being provided to the subscriber. The aggregation of Ethernet links is described below in more detail with reference to FIG. 2.

The asymmetric Ethernet service shown in FIG. 1 may also co-exist with other conventional services such as plain old telephone service ("POTS"). The DSLAM housing the ADSL modems 106 provides a splitter function to interconnect the link back to the Ethernet network 102 with the ADSL modems 106 for data communications while interconnecting voice links from subscriber POTS devices 118 to the PSTN 104. The voice links are passed through a filter-splitter, such as at the service point where the modems 108 are located and also at the splitter function of the DSLAM so that the copper line pairs between the ADSL modems 108 and ADSL modems 106 may carry both the voice signals and the data signals while preventing the data signaling from being heard by the POTS devices. The filtered voice lines 110 extend to the POTS devices 118.

Figure 2:
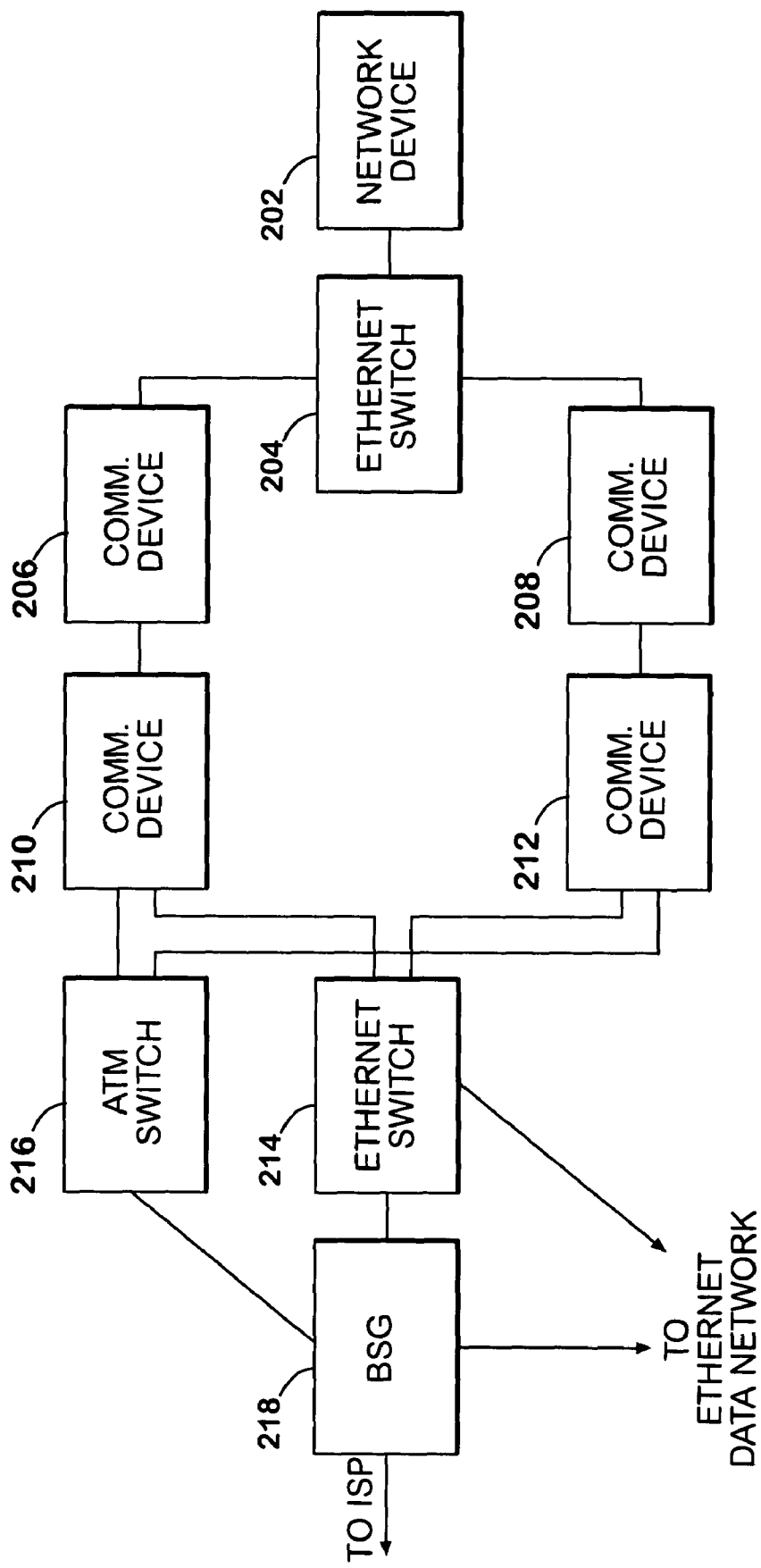
FIG. 2 is a diagram of the connectivity of devices to aggregate Ethernet links, which may be used in embodiments of the present invention.

As shown in FIG. 2, the Ethernet communications of an Ethernet link, such as the Ethernet link to the point of service may be transferred by multiple communications devices 206, 208 such as DSL modems 106 that communicate with distant multiple communications devices 210, 212 such as DSL modems 108. Where the Ethernet service is asymmetric, the upload speed differs from the download speed for the communication devices 206, 208, 210, and 212.

The subscriber has a network device 202 that utilizes Ethernet communications, such as a router linked to a personal computer or such as a NIC of the personal computer. The Ethernet communications are exchanged between the network device 202 and an aggregator device, such as an Ethernet switch 204. The Ethernet switch 204 then communicates with the two communications devices 206, 208 using Ethernet communications and aggregates the two devices 206, 208 for use by the network device 202. The Ethernet switch 204 may aggregate communications with the two devices 206, 208 in accordance with the link aggregation standard IEEE 802.1 ad.

The communications devices 206, 208 then exchange communications with the communications devices 210, 212 over the copper lines between the two sets of devices. This exchange is asymmetric when providing the asymmetric Ethernet service through application of the asymmetric communications devices on both ends of the connection. The communications devices 210, 212 also communicate with an Ethernet switch 214 that aggregates the communications of the communications devices 210, 212 when exchanging communications with the Ethernet network and other downstream devices such as an ATM switch 216 or broadband service gateway ("BSG") 218. The Ethernet switching that provides for the aggregation of communication devices may alternatively be incorporated into the BSG 218 rather than utilizing an external Ethernet switch 214. The data communications from the communications devices 210, 212 may be exchanged with the Ethernet switch 214 by a direct Ethernet interface for a DSLAM, by ATM interfaces through the ATM switch 216 (e.g., Ethernet over ATM encapsulation), or by interfaces from the BSG 218 (e.g., Ethernet, ATM, or Ethernet encapsulated over an Internet Protocol interface).

To optimize the aggregated communications devices, the aggregator devices such as Ethernet switches 204, 214 may perform rate shaping and/or load balancing. The aggregator devices may perform rate shaping by directing frames of data according to the upload speed of the communications devices being aggregated by the aggregator device. Thus, the aggregator device 204, 214 may store in memory the relative upload speed differential between the two communications devices connected to the ports of the aggregator device. For example, with ADSL the differential may be defined as 8 megabits per second upload for one communication device and 1.5 megabits per second upload for the other communication device, which results in a differential factor of 5.3. The aggregator device may then channel every sixth frame to the communications device with the slow upload speed while the five preceding frames are channeled to the communications device with the fast upload speed.

In addition to rate shaping, the aggregator device may load balance between the communications devices being aggregated. The aggregator device communicates status information with the communications devices to detect the amount of data that a communications device has queued to transfer. If one of the communications devices has overly filled its queue relative to the other communications device, such as due to frame retransmissions or other similar reasons, then more frames are temporarily directed to the other communications device until the relative loads of each communications device have become balanced.

While the discussion above has described the communications devices for providing the asymmetric Ethernet service as ADSL modems, it will be appreciated that other types of communications devices that have asymmetric data transfer rates may be used as well. Furthermore, while the aggregator device has been described as an Ethernet switch, it will be appreciated that other types of aggregator devices may be used as well, such as routers that perform aggregation at the Internet Protocol level as opposed to the Ethernet level. Such a router may be optimized to rate shape and load balance as discussed above, such as by modifying the equal cost multiple paths ("ECMP") code to account for the differential in upload speeds of the communications devices that are attached.

As discussed above, the subscriber of the asymmetric Ethernet service is provided an Ethernet connection at the point of service. The Ethernet service provided to the subscriber at the point of service is made asymmetric so that the effective upload and downloads speeds available to the subscriber and that are supported in the service provider network differ between the Ethernet network and the point of service.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of providing asymmetric Ethernet service, the method comprising:
   providing an Ethernet network remote from a first point of service and in communication with the first point of service;
   establishing an asymmetric Ethernet communication between the Ethernet network and the first point of service to allow access to the Ethernet network by a subscriber, wherein establishing the asymmetric Ethernet communication comprises combining a plurality of asymmetric Ethernet connections between the Ethernet network and the first point of service to cooperatively communicate data between the Ethernet network and the first point of service to thereby increase total download and upload bandwidth to the subscriber; and
   simultaneously communicating a first portion of a subscriber data communication between the first point of service and the Ethernet network on a first one of the asymmetric Ethernet connections and a second portion of the subscriber data communication on a second one of the asymmetric Ethernet connections.

2. The method of claim 1, wherein an upload speed from the first point of service to the Ethernet network through the asymmetric Ethernet communication is faster than a download speed from the Ethernet network through the asymmetric Ethernet communication to the first point of service.

3. The method of claim 1, wherein an upload speed from the first point of service to the Ethernet network through the asymmetric Ethernet communication is slower than a download speed from the Ethernet network through the asymmetric Ethernet communication to the first point of service.

4. The method of claim 1, wherein establishing an asymmetric Ethernet communication between the Ethernet network and the first point of service comprises:
   utilizing a first asymmetric DSL modem to provide a first Ethernet port for connection to the Ethernet network; and
   utilizing a second asymmetric DSL modem to provide a second Ethernet port for the first point of service, where the first asymmetric DSL modem is in data communication with the second asymmetric DSL modem to carry the Ethernet communications asymmetrically.

5. The method of claim 4, wherein establishing an Ethernet communication between the Ethernet network and the first point of service further comprises:
   utilizing a third asymmetric DSL modem to provide a third Ethernet port for connection to the Ethernet network, wherein the third Ethernet port of the third asymmetric DSL modem and the first Ethernet port of the first asymmetric DSL modem are aggregated at a first aggregator device in communication with the Ethernet network; and
   utilizing a fourth asymmetric DSL modem to provide a fourth Ethernet port for the first point of service, wherein the fourth Ethernet port of the fourth asymmetric DSL modem and the second Ethernet port of the second asymmetric DSL modem are aggregated at a second aggregator device at the first point of service.

6. A system for providing asymmetric Ethernet service, the system comprising:
   an Ethernet network including an Ethernet port;
   a first point of service located remotely from the Ethernet network to allow access to the Ethernet network by a subscriber;
   a plurality of asymmetric Ethernet connections between the Ethernet network and the first point of service; and
   first and second aggregators to aggregate download and upload bandwidths of the asymmetric Ethernet connections to increase total download and upload bandwidth to the subscriber, and to simultaneously communicate a first portion of a subscriber data communication between the first point of service and the Ethernet network via a first one of the asymmetric Ethernet connections and a second portion of the subscriber data communication via a second one of the asymmetric Ethernet connections.

7. The system of claim 6, further comprising:
   a first ADSL modem providing an Ethernet port in communication with the Ethernet port of the Ethernet network; and
   a second ADSL modem at the first point of service in communication with the first ADSL modem to carry the Ethernet communications asymmetrically.

8. The system of claim 7, wherein the Ethernet network further comprises:

a third ADSL modem aggregated with the first ADSL modem; and a fourth ADSL modem in communication with the third ADSL modem and being aggregated with the second ADSL modem to carry Ethernet communications asymmetrically.

9. The system of claim 8, further comprising a first Ethernet switch aggregating the first ADSL modem with the third ADSL modem and a second Ethernet switch aggregating the second ADSL modem with the fourth ADSL modem.

10. The system of claim 9, wherein the first and second Ethernet switches perform rate shaping and load balancing when transferring data.

11. The system of claim 6, wherein an upload speed from the first point of service to the Ethernet network is faster than a download speed from the Ethernet network to the first point of service.

12. The system of claim 6, wherein an upload speed from the first point of service to the Ethernet network is slower than a download speed from the Ethernet network to the first point of service.

13. A system for providing asymmetric Ethernet service to a network device of a subscriber, the system comprising:
  an Ethernet network including an Ethernet port;
  a first point of service located remotely from the Ethernet network;
  a first asymmetric Ethernet connection between the first point of service and the Ethernet port of the Ethernet network;
  a second asymmetric Ethernet connection between the first point of service and the Ethernet port of the Ethernet network;
  a first aggregator device coupled to the first point of service to simultaneously transmit a first portion of a first communication via the first asymmetric Ethernet connection and a second portion of the first communication via the second asymmetric Ethernet connection, to increase total upload bandwidth to the subscriber, and to receive a third portion of a second communication between the first point of service and the Ethernet port of the Ethernet network via the first asymmetric Ethernet connections and a fourth portion of the second communication via the second asymmetric Ethernet connection to thereby increase total download bandwidth to the subscriber; and
  a second aggregator device coupled to the Ethernet network to simultaneously transmit the third portion of the second communication via the first asymmetric Ethernet connection and the fourth portion of the second communication via the second asymmetric Ethernet connection to thereby increase the total download bandwidth to the subscriber, and to combine the first portion and the second portion of the first communication.

14. The system of claim 13, wherein the first Ethernet connection between the first point of service and the network device of the subscriber includes a router positioned between the first point of service and a computer.

15. The system of claim 13, further comprising an ADSL modem providing the Ethernet port of the Ethernet network.

16. The system of claim 15, wherein the Ethernet network further comprises a second ADSL modem in communication with the ADSL modem.

17. The system of claim 16, wherein the Ethernet network further comprises a third ADSL modem aggregated with the ADSL modem and further comprises a fourth ADSL modem in communication with the third ADSL modem and being aggregated with the second ADSL modem.

18. The system of claim 17, wherein the Ethernet network further comprises a first Ethernet switch aggregating the ADSL modem with the third ADSL modem and a second Ethernet switch aggregating the second ADSL modem with the fourth ADSL modem.

19. The system of claim 18, wherein the first and second Ethernet switches perform rate shaping and load balancing when transferring data.

20. The system of claim 13, wherein an upload speed from the first point of service to the service provider network is faster than a download speed from the service provider network to the first point of service.

21. The system of claim 13, wherein an upload speed from the first point of service to the service provider network is slower than a download speed from the service provider network to the first point of service.

22. A method of providing asymmetric Ethernet service, the method comprising:
  providing an Ethernet network remote from a first subscriber location;
  establishing a plurality of ADSL connections between the Ethernet network and the first subscriber location;
  receiving a first subscriber data communication from the first subscriber location;
  transmitting a first portion of the first subscriber data communication via a first one of the plurality of ADSL connections and a second portion of the subscriber data communication via a second one of the plurality of ADSL connections, wherein the transmitting the first and second portions occurs at a first transmission rate;
  aggregating the first and second portions of the first subscriber data communication from the first and second ADSL connections for communication with the Ethernet network;
  receiving a second subscriber data communication from the Ethernet network;
  transmitting a first portion of the second subscriber data communication via the first one of the plurality of ADSL connections and a second portion of the second subscriber data communication via the second one of the plurality of ADSL connections, wherein the transmitting the first and second portions occurs at a second transmission rate different than the first transmission rate; and
  aggregating the first and second portions of the second subscriber data communication from the first and second ADSL connections for communication with the first subscriber location.

* * * * *